United States Patent
Eisenbarth et al.

(10) Patent No.: US 12,247,996 B2
(45) Date of Patent: Mar. 11, 2025

(54) METHOD OF COMPENSATING FOR SENSOR TOLERANCES

(71) Applicant: Dr. Ing. h.c. F. Porsche Aktiengesellschaft, Stuttgart (DE)

(72) Inventors: Markus Eisenbarth, Stuttgart (DE); David Caredda, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 255 days.

(21) Appl. No.: 18/082,672

(22) Filed: Dec. 16, 2022

(65) Prior Publication Data

US 2023/0194565 A1     Jun. 22, 2023

(30) Foreign Application Priority Data

Dec. 16, 2021  (DE) .................. 10 2021 133 387.3

(51) Int. Cl.
  *G01P 15/18*   (2013.01)
  *B60W 40/107*  (2012.01)
  (Continued)

(52) U.S. Cl.
  CPC .......... *G01P 15/18* (2013.01); *B60W 40/107* (2013.01); *B60W 40/109* (2013.01); *B60W 50/0205* (2013.01)

(58) Field of Classification Search
  CPC ... G01P 15/18; B60W 40/107; B60W 40/109; B60W 50/0205; B60W 2050/0056; B60W 2050/0085; B60W 2050/0215
  See application file for complete search history.

(56) References Cited

U.S. PATENT DOCUMENTS

| 6,782,315 B2 | 8/2004 | Lu et al. |
| 7,085,642 B2 | 8/2006 | Samuel et al. |

(Continued)

FOREIGN PATENT DOCUMENTS

| DE | 10327590 A1 | 1/2004 |
| DE | 102007028228 A1 | 1/2009 |
| DE | 102017212715 B3 | 1/2019 |

*Primary Examiner* — Helen C Kwok
(74) *Attorney, Agent, or Firm* — Buchanan Ingersoll & Rooney PC

(57) ABSTRACT

A method for compensating sensor tolerances of accelerometers of a vehicle. The method includes following steps: recording of measurement signals of at least three similarly oriented accelerometers, calculation of an acceleration ($a_{b,z}$) at a reference position in the spatial direction, which corresponds to the orientation of the accelerometers, low-pass filtering of the measurement signals, determination of tolerance parameters ($c_x$, $c_y$, $c_z$) of each sensor via an optimization method with the aid of the calculated acceleration ($a_{b,z}$) at the reference position, and calculation of the adjusted measurement signals from the recorded measurement signals and the tolerance parameters ($c_x$, $c_y$, $c_z$).

7 Claims, 1 Drawing Sheet

(51) Int. Cl.
  *B60W 40/109* (2012.01)
  *B60W 50/02* (2012.01)

(56) References Cited

U.S. PATENT DOCUMENTS

| | | | |
|---|---|---|---|
| 2004/0249545 A1* | 12/2004 | Lu | B60T 8/172 |
| | | | 701/70 |
| 2007/0179735 A1* | 8/2007 | Fiedler | B60T 8/885 |
| | | | 702/150 |
| 2011/0048103 A1* | 3/2011 | Su | G01C 21/166 |
| | | | 73/1.79 |
| 2016/0091530 A1* | 3/2016 | Ummethala | G01P 21/00 |
| | | | 701/33.1 |
| 2021/0156714 A1 | 5/2021 | Delgado | |

* cited by examiner

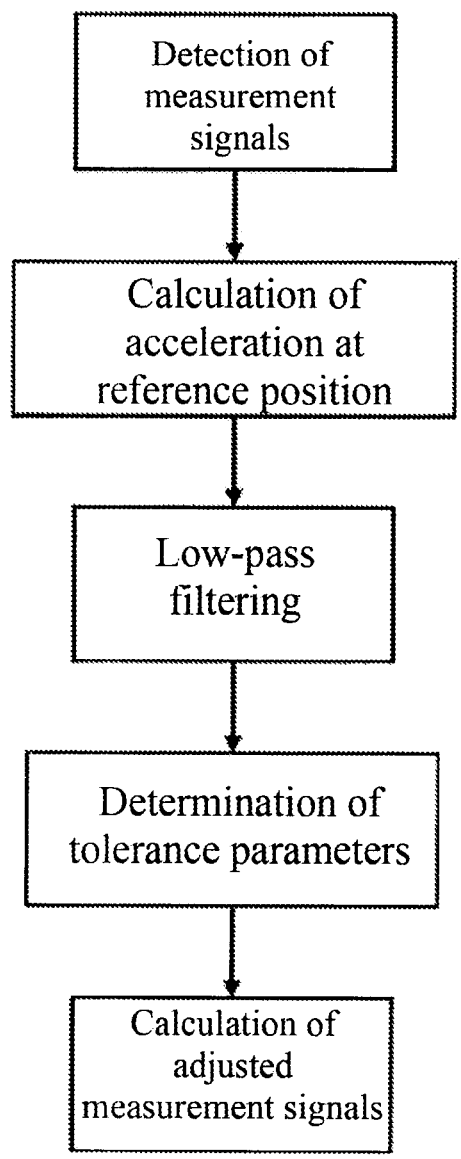

METHOD OF COMPENSATING FOR SENSOR TOLERANCES

CROSS-REFERENCE TO RELATED APPLICATION

This application claims priority to German Patent Application No. 10 2021 133 387.3, filed Dec. 16, 2022, the content of such application being incorporated by reference herein in its entirety.

FIELD OF THE INVENTION

The invention relates to a method for compensating sensor tolerances of accelerometers in a vehicle and a computer program product for carrying out such a method.

BACKGROUND OF THE INVENTION

In modern driving dynamics systems, a large number of sensors are used, for example, a variety of types of accelerometers, in order to detect the driving dynamics of a vehicle as accurately as possible and to adjust the driving dynamics systems to the respective driving situations as efficiently as possible. In particular, accelerometers that are installed vertically and are thus intended to measure the vertical acceleration of the vehicle play a special role for the active roll stabilization.

Due to tolerances in the measurement itself and due to certain installation tolerances in relation to the sensor orientation, inaccuracies occur in the measurement of the corresponding sensors. Thus, in addition to a vertical acceleration $a_{S,z}$, vertically installed accelerometers also proportionately measure a longitudinal acceleration $a_{S,x}$ and a transverse acceleration $a_{S,y}$ of the structure at the corresponding sensor position. These incorrectly recorded components in the longitudinal and transverse direction to the structure of the vehicle prevent a more accurate measurement and hence more precise control of driving dynamics.

In the prior art, various methods are proposed in order to eliminate tolerances from the measurement, at least approximately. DE 103 27 590 A1 proposes the determination of installation tolerances of structure accelerometers for measuring the rolling, yawing, and pitching movements in the form of angular faults. However, the compensation of tolerances of accelerometers for translational movements cannot be done with the methodology proposed therein.

U.S. Pat. No. 7,085,642 B2, which is incorporated by reference herein, discloses a method in which constant sensor offsets are compensated over a moving average. A distinction is made between the standing and traveling states of the vehicle to which the sensors are mounted. A dynamic compensation of the sensor tolerances in each driving situation does not occur.

DE 10 2007 028 228 B4, which is incorporated by reference herein, proposes checking the quality of sensor signals in which the sensor faults can be isolated from the target signal by frequency analyses. In DE 10 2017 212 715 B3, which is incorporated by reference herein, a method for sensor signal processing is proposed, in which a dynamic sampling frequency in the power save mode is specified differently than in a normal mode.

All of the above described methods are concerned with detecting and in part also with eliminating sensor measurement inaccuracies for the driving dynamic measurement. However, a permanent checking and compensation of the inaccuracies of accelerometers while in driving mode cannot be performed according to the prior art.

Accordingly, it would be desirable to remedy the above described disadvantages and to provide a method for compensating sensor tolerances.

SUMMARY OF THE INVENTION

The method according to aspects of the invention for compensating sensor tolerances of accelerometers of a vehicle first comprises the method step according to which measurement signals are detected by at least three similarly oriented accelerometers. Here, "similarly oriented" means that the sensors are provided in order to detect the acceleration in the same spatial direction. There are generally three possible spatial directions: one in the longitudinal vehicle direction (x-axis), one in the transverse vehicle direction (y-axis), and a vertical axis (z-axis) that is perpendicular to the first two axes.

Subsequently, an acceleration is calculated at a defined reference position. Here, the reference position refers to a position that is different from the three accelerometers whose distances to the sensor positions are fully known. The acceleration in the spatial direction in which the at least three accelerometers are also oriented is determined. If, for example, the acceleration of the vehicle in the vertical direction is detected by the accelerometers, the acceleration at the reference position is also calculated in the vertical direction.

Subsequently, the measurement signals are filtered through a low-pass filter. In this way, acceleration portions of the recorded measurement signals can be filtered out, which causes a distortion of the measurement signals. These are, in particular, the rolling and pitching acceleration of the vehicle.

By filtering, the measurement signals can be converted into a solvable system of equations, which can be solved in a further step via known optimization methods. The acceleration at the reference position is also used in order to solve the system of equations. The system of equations contains tolerance parameters which represent the deviation of the measurement signals due to the installation and measurement tolerances. By solving the system of equations, these tolerance parameters can be identified.

Subsequently, the measurement signals are adjusted by the correspondingly determined tolerance parameters in the spatial directions in order to thus arrive at tolerance-compensated, more precise measurement signals, which can then be used for the driving dynamic control.

In one advantageous embodiment of the invention, each of the tolerance parameters corresponds to one of the spatial directions. In this way, it can be identified to what extent a deviation in one of the spatial directions is present, and thus a correction of the positioning, etc., of the corresponding sensor can be performed.

In a further advantageous embodiment of the invention, the rigid body movement of the vehicle structure is used in order to determine the tolerance parameters. This allows for various simplifications of the system of equations to be solved.

In a further advantageous embodiment of the invention, in order to calculate the acceleration at the reference position, the yawing rate of the vehicle at the reference position is measured by a corresponding sensor. With the aid of the yawing rate, it is possible to determine the acceleration at the reference position. This represents a relatively easily implementable solution for calculating the acceleration at the reference position, which is subjected to only a few approximations and inaccuracies. Thus, the accuracy of the determination of the acceleration at the reference position can be ensured.

Further advantageous is an embodiment of the invention in which the least-squares-fault method is employed in order to determine the tolerance parameters. This is a mathematically well-known method, which can be implemented relatively easily in such calculation processes.

BRIEF DESCRIPTION OF THE DRAWING

FIG. 1 shows a flow chart of the method according to aspects of the invention.

As explained above in further detail, the measurement signals of the accelerometers are first detected. Subsequently, the acceleration is calculated at a specified and accurately known reference position, and the detected measurement signals are low-pass filtered. The obtained data is used in order to determine tolerance parameters. The tolerance parameters are then used in order to calculate adjusted measurement signals.

DETAILED DESCRIPTION OF THE INVENTION

An embodiment of the method according to aspects of the invention is described in further detail below. The subject addressed here is the compensation of the sensor tolerances of accelerometers, which are provided in order to record a vertical acceleration of the vehicle. It should be noted that, in principle, the method is also suitable analogously for compensating accelerometers in the longitudinal or transverse direction to the vehicle.

As already described above, in addition to the vertical component of a vehicle acceleration to be detected, accelerometers (sensors) $a_{S,z}$ also record components of the transverse acceleration $a_{S,y}$ and the longitudinal acceleration $a_{S,x}$ of the vehicle, respectively. As described, this is attributable to measurement tolerances and installation tolerances of the sensor. Thus, taking into account a linearization allowable for small angles, the measured acceleration of a sensor $a_S$ can be expressed as follows:

$$a_S \approx a_{S,x} c_x + a_{S,y} c_y + c_z + a_{S,z}$$

The factors $c_x$ and $c_y$ and the offset $c_x$ of the vertical acceleration result from the tolerances (tolerance parameters). The longitudinal and transverse acceleration at the sensor position $a_{S,x}$ and $a_{S,y}$ can be calculated from the rigid body movement of the vehicle structure.

$$a_{S,x} \approx a_{b,x} - \dot{\omega}_{b,z} r_y - \omega_z^2 r_x$$

$$a_{S,y} \approx a_{b,y} - \dot{\omega}_{b,z} r_x - \omega_z^2 r_y$$

Here, $a_b$, represents the longitudinal acceleration at the reference position, $a_{b,y}$ represents the transverse acceleration at the reference position, $\dot{\omega}_{b,z}$ represents the yawing acceleration, and $\omega_z$ represents the yawing rate of the structure. The distances from the reference position to the sensor position are provided as $r_x$, $r_y$ in the equations. The yawing rate $\omega_z$ can be measured by a corresponding sensor, and the yawing acceleration $\dot{\omega}_{b,z}$ can be derived from the yawing rate. Disregarding the acceleration portions dependent on the rotation rates, the vertical acceleration at the sensor position $a_{S,z}$ results according to $$a_{S,z} \approx \begin{bmatrix} 1 & r_{S,y} & -r_{S,x} \end{bmatrix} \begin{pmatrix} a_{b,z} \\ \dot{\omega}_{b,x} \\ \dot{\omega}_{b,y} \end{pmatrix}$$

from the vertical acceleration at the reference position $a_{b,z}$, the rolling acceleration at the reference position $\dot{\omega}_{b,x}$, the pitching acceleration at the reference position $\dot{\omega}_{b,y}$, and the distances $r_{S,x}$, and $r_{S,y}$ between the sensor position and the reference position.

By converting the above equation, the rolling, pitching, and vertical acceleration at the reference position can be calculated by adding the measurement results of the vertical accelerations of the three sensors.

$$\begin{pmatrix} a_{b,z} \\ \dot{\omega}_{b,x} \\ \dot{\omega}_{b,y} \end{pmatrix} = (H^T H)^{-1} H^T \begin{pmatrix} a_{S1,z} \\ a_{S2,z} \\ a_{S3,z} \end{pmatrix}$$

The matrix H must be formulated as follows:

$$H = \begin{bmatrix} 1 & r_{S1,y} & -r_{S1,x} \\ 1 & r_{S2,y} & -r_{S2,x} \\ 1 & r_{S3,y} & -r_{S3,x} \end{bmatrix}$$

In stationary driving maneuvers, the rolling acceleration $\dot{\omega}_{b,x}$ and pitching acceleration $\dot{\omega}_{b,y}$ are equal to zero. Accordingly, the vertical accelerations at the various sensor positions $a_{Si,z}$ correspond to the vertical acceleration at the reference position $a_{b,z}$. Thus, in stationary driving maneuvers, for the part of the acceleration $\Delta a_{S,z}$ that is dependent on the tolerances of the sensors, the following can be formulated.

$$\Delta a_{S,z} = a_{S,z} - a_{b,z} = a_{S,x} c_x + a_{S,y} c_y + c_z$$

In corresponding driving maneuvers, the signal content of the measurement signals of the sensors contains low-frequency portions corresponding to the portions of the stationary driving maneuver (stationary portions) as well as high-frequency portions, which [are] attributable to the rolling and pitching acceleration. Thus, by low-pass filtering, the signal content can be limited to the stationary portions. Thus, the tolerance parameters $c_x$, $c_y$, and $c_z$ can be identified from different maneuvers using the least-squares-fault method. For the signal values of m time points, the correlation in matrix notation can be given as follows.

$$\underbrace{\begin{pmatrix} \Delta a[0] \\ \vdots \\ \Delta a[m] \end{pmatrix}}_{\Delta \vec{a}_{[1,m]}} = \underbrace{\begin{bmatrix} a_{S,x}[1] & a_{S,y}[1] & 1 \\ \vdots & \vdots & \vdots \\ a_{S,x}[m] & a_{S,y}[m] & 1 \end{bmatrix}}_{R_{[1,m]}} \underbrace{\begin{pmatrix} c_x \\ c_y \\ c_z \end{pmatrix}}_{\Delta \vec{c}_{[1,m]}}$$

The index [1,m] indicates that the values of the first to the m-th signal sampling are considered in the matrix. If the product of the matrix R is invertable with its transposes, the parameters can be determined according to $$\vec{c}_{[1,m]} = \underbrace{\left( R_{[1,m]}^T R_{[1,m]} \right)^{-1}}_{L_{[1,m]}} \underbrace{R_{[1,m]}^T \Delta a_{[1,m]}}_{P_{[1,m]}}$$

The matrix L and vector p can be easily renewed and extended by the appropriate value with a new sampling at the time m+1.

$$L_{[1,m+1]} = L_{[1,m]} + R_{[m+1,m+1]}^T R_{[m+1,m+1]}$$

$$p_{[1,m+1]} = p_{[1,m]} + R_{[m+1,m+1]}^T \Delta \vec{a}_{[1,m+1]}$$

Due to external influences, for example temperature changes, changes in the travel situation, or mechanical influences, for example a slight change in the sensor position due to a potentially unwanted contact of the sensor during service, it is advantageous for more recent measurement signals to have a greater importance for the calculation than older ones. To increase the weighting of more recent measured values versus that of older readings, an update factor $f_u$ can be introduced, thereby changing the equations as follows.

$$L_{[m+1]}^* = (1-f_u)L_{[m]}^* + f_u L_{[m+1,m+1]}$$

$$p_{[m+1]}^* = (1-f_u)p_{[m]}^* + f_u p_{[m+1,m+1]}$$

This results in a recursive correlation for L* and p*, with which the tolerance parameters c* for the weighted sampling can be calculated.

$$c_{[m]}^* = L_{[m]}^{*-1} p_{[m]}^*$$

Finally, initial parameters for the calculation must be defined. For this purpose, for example for $L_{[m]}^*$, the unit matrix I can be selected and specified for $p_{[0]}^* = c_{[0]}^*$. It is disadvantageous, however, that the measurement of the driving dynamics would initially contain a large deviation until, through a sufficiently large recording of measured values, more realistic values are recorded while passing through various driving maneuvers.

Another alternative first allows the method to run in the background without allowing the compensation to be directly incorporated into the measurement of the driving dynamics. Here, values can be recorded and incorporated into the system of equations of the compensation, wherein it is checked whether the system of equations can be solved for the measured values. If sufficient measured values have been recorded for which the system of equations can be solved, $p_{[0]}^*$ and $L_{[m]}^*$ can be calculated on the basis of the available values, and the compensation of the measured value recording can be started.

What is claimed is:

1. A method of compensating for sensor tolerances of accelerometers of a vehicle, said method comprising the following steps:
   (A) recording measurement signals of at least three similarly oriented accelerometers,
   (B) calculating an acceleration ($a_{b,z}$) at a reference position in a spatial direction corresponding to an orientation of the accelerometers,
   (C) low-pass filtering the measurement signals,
   (D) determining tolerance parameters ($c_x$, $c_y$, $c_z$) of each accelerometer via an optimization method with the aid of the calculated acceleration ($a_{b,z}$) at the reference position, and
   (E) calculating adjusted measurement signals from the recorded measurement signals and the tolerance parameters.

2. The method according to claim 1, wherein each of the tolerance parameters ($c_x$, $c_y$, $c_z$) corresponds to one of the tolerances of one of the accelerometers in the spatial direction.

3. The method according to claim 1, wherein a rigid body movement of a vehicle structure of the vehicle is used in order to determine the tolerance parameters ($c_x$, $c_y$, $c_z$).

4. The method according to claim 1, wherein, the calculating the acceleration ($a_{b,z}$) at the reference position, a yawing rate ($\omega_z$) at the reference position is measured by a sensor.

5. The method according to claim 1, further comprising using a least-squares-fault method in order to determine the tolerance parameters ($c_x$, $c_y$, $c_z$).

6. A computer program product comprising a non-transitory computer readable storage medium storing computer instructions which, when executed by a computer, cause the computer to perform a method of compensating for sensor tolerances of accelerometers of a vehicle, the method comprising the steps of:
   (A) recording measurement signals of at least three similarly oriented accelerometers,
   (B) calculating an acceleration ($a_{b,z}$) at a reference position in a spatial direction corresponding to an orientation of the accelerometers,
   (C) low-pass filtering the measurement signals,
   (D) determining tolerance parameters ($c_x$, $c_y$, $c_z$) of each accelerometer via an optimization method with the aid of the calculated acceleration ($a_{b,z}$) at the reference position, and
   (E) calculating adjusted measurement signals from the recorded measurement signals and the tolerance parameters.

7. A vehicle comprising the computer program product of claim 6.

* * * * *